(12) United States Patent
King et al.

(10) Patent No.: US 6,948,835 B2
(45) Date of Patent: Sep. 27, 2005

(54) ADJUSTABLE REAR LAMP

(75) Inventors: Troy L. King, Pendleton, IN (US); Kevin M. Robinson, Alexandria, IN (US); Robert K. Schuyler, Lapel, IN (US)

(73) Assignee: Guide Corporation, Pendleton, IN (US)

( * ) Notice: Subject to any disclaimer, the term of this patent is extended or adjusted under 35 U.S.C. 154(b) by 2 days.

(21) Appl. No.: 10/738,401

(22) Filed: Dec. 17, 2003

(65) Prior Publication Data

US 2005/0135111 A1 Jun. 23, 2005

(51) Int. Cl.[7] ............................................. B60Q 1/068
(52) U.S. Cl. ..................... 362/512; 362/523; 362/285; 362/287; 362/418; 411/366.1
(58) Field of Search ............................. 362/512–532, 362/285, 287, 418

(56) References Cited

U.S. PATENT DOCUMENTS

| | | |
|---|---|---|
| 572,431 A | 12/1896 | Magee |
| 1,772,770 A * | 8/1930 | Coulter ....................... 362/287 |
| 2,104,911 A | 1/1938 | Snyder |
| 2,115,982 A | 5/1938 | Worden |
| 3,508,593 A * | 4/1970 | Gill .............................. 411/182 |
| 4,532,577 A | 7/1985 | Shelton |
| 5,381,317 A | 1/1995 | Schmitt et al. |
| 5,513,085 A | 4/1996 | Bourne |
| 5,580,149 A | 12/1996 | Kusagaya |
| 5,673,992 A | 10/1997 | Schmitt |
| 5,735,656 A | 4/1998 | Marvell et al. |
| 5,741,059 A | 4/1998 | Kusagaya |
| 2002/0044440 A1 | 4/2002 | Chiang |
| 2002/0118549 A1 | 8/2002 | Esser et al. |

* cited by examiner

*Primary Examiner*—Thomas M. Sember
*Assistant Examiner*—James W Cranson, Jr.
(74) *Attorney, Agent, or Firm*—Ice Miller

(57) ABSTRACT

An adjustable rear lamp is disclosed to allow the adjustment of a lamp housing within the lamp cavity of an automobile's body frame. A threaded bolt is inserted into an opening in the sheet metal of an automobile. A nut is attached to the threaded bolt. The threaded bolt surrounds a threaded shaft, and one end of the threaded shaft is attached to the lamp housing. The nut and threaded bolt may be rotated, engaging the threaded shaft and moving the threaded shaft into or out of the lamp cavity. The movement of the threaded shaft and the lamp housing allows the lamp housing to be positioned precisely within the lamp cavity.

12 Claims, 4 Drawing Sheets

ADJUSTABLE REAR LAMP

BACKGROUND

Automobile rear lamps are attached to sheet metal panels behind the automobile's body panels. These sheet metal panels form a cavity into which the lamp assembly is seated. The sheet metal panels are attached to the automobile body in a precise position, so that the rear lamps positioned within the cavity are flush with the body panels. Occasionally, the automobile manufacturing process places the sheet metal panels slightly out of the ideal position. The improperly placed sheet metal panels do not allow the flush positioning of the rear lamps with respect to the body panels. Instead, the rear lamps either extend too far out of the cavity, or too far into the cavity. Of course, a wide spectrum of improper positioning is possible, from slightly out of alignment with the body panels, to widely out of alignment. In either event, the rear lamps are not flush with the automobile's external body panels. Alternately, large manufacturing tolerances in the rear lamps can create the same condition of improper positioning, or a combination of the two could create improper positioning of the rear lamps with respect to the body panels. In any event, a misalignment of the rear lamps and the body panels creates the appearance of an improperly manufactured automobile, and is thus undesirable both to the automobile manufacturer and to the automobile consumer. The defective sheet metal panels may be bent into the proper alignment, or some other corrective action may be taken, but corrective action invites damage to the automobile, and is time consuming to implement. In some cases, the manufacturing defect may not be repairable by bending the sheet metal panels, requiring replacement of the sheet metal.

A desirable feature of a rear lamp, given the above difficulties in their positioning, would be to add a mechanism to adjust the rear lamp inside of the cavity. Such a mechanism would allow for variations in manufacturing, and allow the automobile manufacturer to quickly and precisely adjust the rear lamp inside the cavity to align with the body panels.

SUMMARY

An adjustable rear lamp comprises a substantially cylindrical threaded sleeve positioned within a hole in the automobile's sheet metal body frame. The sheet metal body frame and the body panels of the automobile define a lamp cavity where a lamp housing is deposited. The inside cylindrical walls of the threaded sleeve contain threads. The threaded inside cylindrical walls engage threads deposited on a threaded rod, which is positioned inside the threaded sleeve. An additional set of threads on the threaded rod is engaged with similarly sized threads on the inside of a lamp housing, attaching the lamp housing to the threaded rod on the front side of the sheet metal body frame. A nut is fixedly attached to the threaded sleeve on the rear side of the sheet metal body frame. A foam insert surrounds the threaded rod on the rear side of the sheet metal body frame, and a retaining clip also surrounds the threaded rod, and serves to secure the foam insert against the sheet metal body frame.

Rotation of the nut imparts rotation to the threaded sleeve. The threads of the threaded sleeve rotate and engage the threads of the threaded bolt, and move the threaded bolt into or out of the lamp cavity, along the cylindrical axis of both the threaded bolt and the threaded sleeve. The lamp housing ideally aligns with the plane that the top and bottom body panels of the automobile have created. Where the lamp housing expends unacceptably into or out of the lamp cavity, and does not align with the top and bottom body panels, corrective action may be taken by rotating the nut in either a clockwise or counterclockwise manner.

These and other advantages and features of the present invention shall hereinafter appear, and for the purposes of illustration, but not limitation, exemplary embodiments of the present invention shall hereinafter be described.

DETAILED DESCRIPTION

Figure 1:
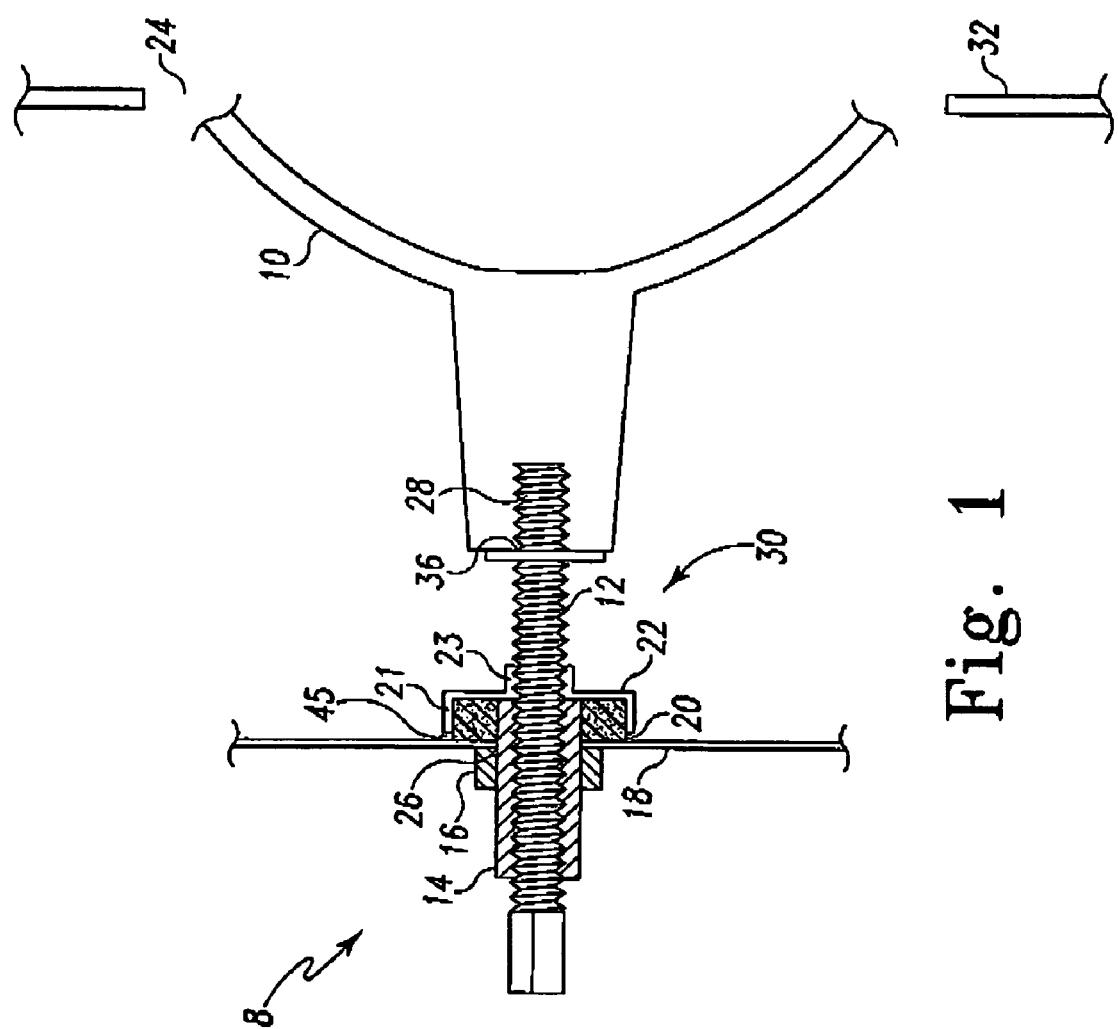
FIG. 1 is a side view of an adjustable rear lamp.

One embodiment of an adjustable rear lamp is provided as shown in FIG. 1, and is generally denoted as numeral 8. The adjustable rear lamp 8 comprises a threaded sleeve 14 positioned within an opening 26 in a sheet metal automobile body frame 18. A nut 16 is fixedly attached to the threaded sleeve 14 to facilitate rotation of the threaded sleeve 14 within the opening 26. A threaded bolt 12 is positioned such that the threaded sleeve 14 surrounds the threaded bolt 12. A lamp housing 10 is positioned within a lamp cavity 30 defined by the body of the automobile, and is also attached to the threaded bolt 12.

The lamp cavity 30 is defined between the automobile's body panels 32 and sheet metal 18 located behind the body panels 32. An opening 26 is present in the sheet metal frame 18, providing passage from the inside of the lamp cavity 30 to the exterior of the lamp cavity 30.

The threaded sleeve 14 is positioned within the opening 26. The threaded sleeve 14 is made from a plastic material, and substantially has the shape of a hollow cylinder, open at both ends. The threaded sleeve 14 is dimensioned such that the outer radius of the threaded sleeve 14 is similar to the radius of the opening 26, so that the threaded sleeve 14 may freely rotate within the opening 26. Alternatively, the threaded sleeve 14 may be made from a metal. Threads are deposited on the inner cylindrical walls of the threaded sleeve 14.

The threaded bolt 12 extends through the opening 26 in the sheet metal frame 18. The threaded bolt 12 is substantially cylindrical and is made from a metallic material. The threaded bolt 12 is dimensioned similarly to the dimension of the inner cylindrical walls of the threaded sleeve 14. The threaded bolt 12 has threads deposited along its outside radius, which engage with the threads deposited on the inner cylindrical walls of the threaded sleeve 14. A threaded appendage 28 located at one end of the threaded bolt 12 contains threads along its outside radius that engage threads deposited on the inside of the opening 36 in the lamp housing 10, securing the lamp housing 10 to the threaded bolt 12. The lamp housing 10 may comprise any one of a number of light source and reflector arrangements, which are well known in automobile lighting art. The lamp housing 10 may further utilize a lens or other protective element covering the reflector.

The nut 16 may be formed from either a plastic or metal material, surrounds the threaded sleeve 14, and is adjacent to the sheet metal frame 18 on the outside of the lamp cavity 30. The nut 16 is fixed to the threaded sleeve 14, so that rotation of the nut 16 imparts rotation to the threaded sleeve 14. The nut 16 may be hexagonally shaped to allow rotation using standard wrenches and/or tools.

A foam insert 20 snugly surrounds the threaded bolt 12 and is adjacent to the rear side of the sheet metal frame 18 on the inside of the lamp cavity 30. A retaining clip 22 comprises a substantially cylindrical center section 23, and side flanges 21 which extend from the center section 23 and back toward the sheet metal frame 18. A small gap 45 separates the side flanges 21 of the retaining clip 22 from the rear surface of the sheet metal frame 18. The retaining clip 22 may be made from a metal or plastic material. The center section 23 is positioned on the inside of the lamp cavity 30 and contains an opening which surrounds the threaded bolt 12. Threads deposited on the inside of the center section 23 engage the threads on the threaded bolt 12. The side flanges 21 extend toward the sheet metal frame 18 and snugly surround the foam insert 20. Because the foam insert fits snugly around the threaded sleeve, and because the side flanges 21 fit snugly against the foam insert, the retaining clip is connected to the threaded sleeve. Accordingly, rotation of the threaded sleeve 14 also results in rotation of the retaining clip 22 and foam insert 20.

While the retaining clip 22 is not completely fixed to the threaded sleeve 14, it is releaseably connected thereto. In particular, the connection between the threaded sleeve 14 and the retaining clip 22 is maintained because of the friction fit provided between the foam insert 20 and the threaded sleeve 14 and the friction fit between the foam insert 20 and the retaining clip 22. In one embodiment of the invention, small projections may extend from the retaining clip 22 and the threaded sleeve at the location of the foam insert to increase the surface friction between the parts. With the friction fit between the retaining clip 22, foam insert 20 and threaded sleeve 14, rotation of the threaded sleeve also results in rotation of the retaining clip. When this occurs the threads on the bolt 12 mesh with the threads on both the sleeve 14 and the retaining clip and the bolt 12 moves in the axial direction of the bolt relative to both the threaded sleeve and the retaining clip.

The threaded sleeve is prevented from any significant movement in the axial direction of the threaded sleeve. First, the nut 16 prevents the threaded sleeve from moving rearward (in the direction of arrow 42 in FIG. 4). Second, the foam insert, which is retained in place by retaining clip 22, prevents the threaded sleeve from moving forward (in the direction of arrow 40 in FIG. 3). However, depending upon the size of the gap 45, some small amount of play is possible for the threaded sleeve, because it is possible for the foam insert 20 to be compressed if adequate force is applied to the foam insert in the direction of arrow 40 in FIG. 3. Nevertheless, because the foam insert is resilient, any movement in this direction is reversed once the force causing the movement is removed.

Figure 2:
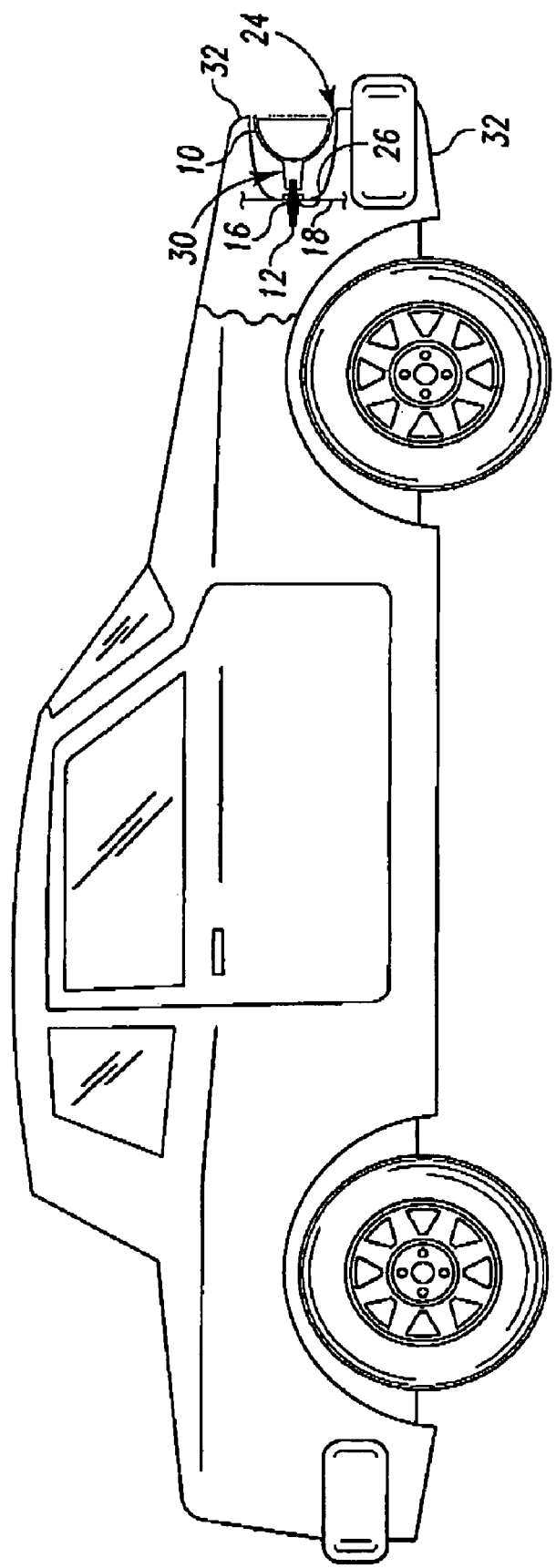
FIG. 2 is side view of the adjustable rear lamp installed in an exemplary automobile.

Operation of the disclosed embodiment of an adjustable rear lamp 8 is now described as shown in FIGS. 1–4. As shown in FIG. 2, the adjustable rear lamp 8 is installed in an exemplary automobile having a lamp cavity 30. The threads of the threaded bolt 12 engage the threads of the threaded sleeve 14 and secure the lamp housing to the sheet metal 18.

Figure 3:
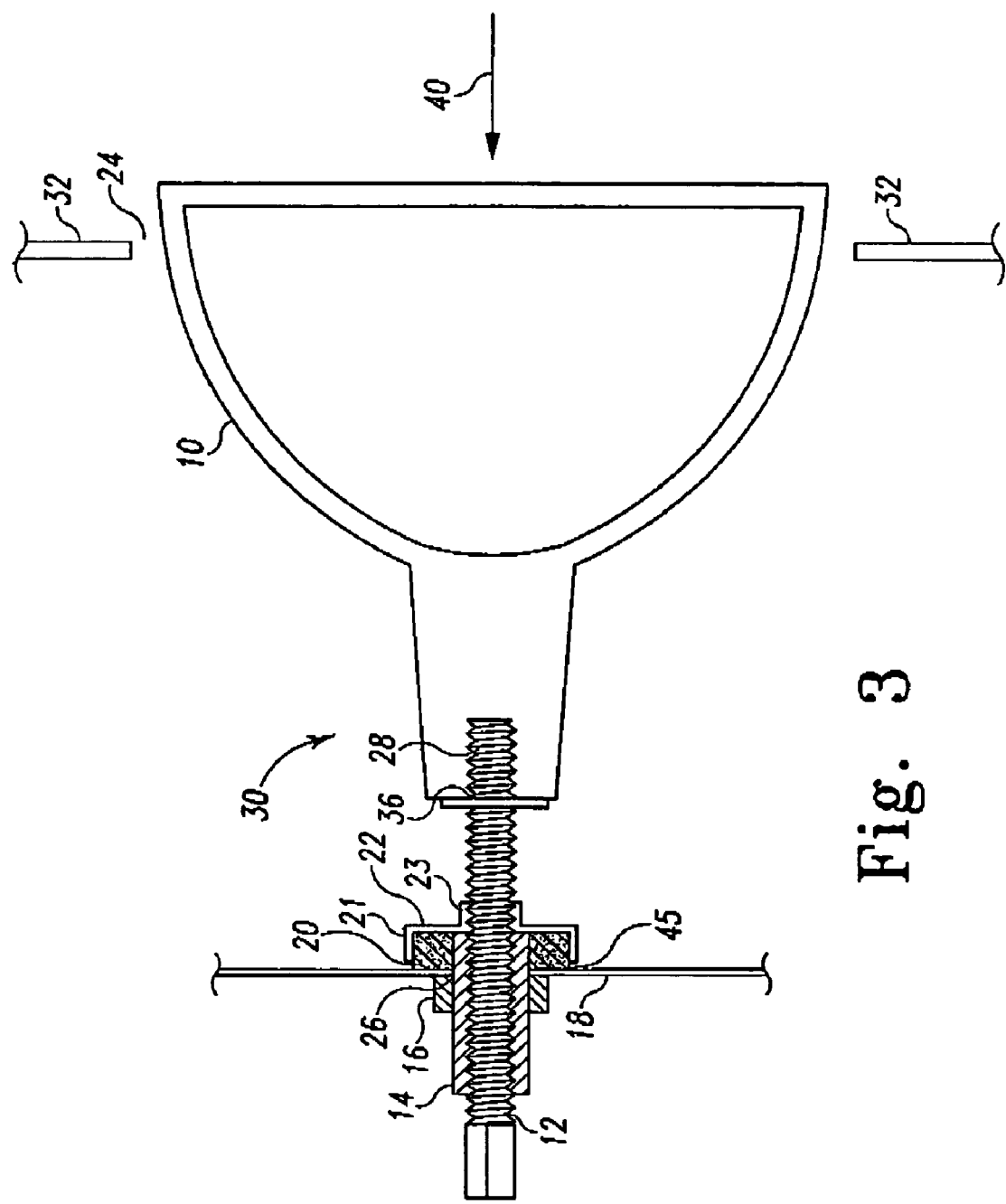
FIG. 3 is a side view of the adjustable rear lamp of FIG. 1, where the lamp housing improperly extends out of the lamp cavity.

A cut away view of an adjustable rear lamp 8 installed in an automobile, where the lamp housing 10 extends inappropriately out of the lamp cavity 30, is shown in FIG. 3. The lamp housing 10 in FIG. 3 extends out of the lamp cavity 30 such that the lamp housing 10 is not flush with the body panels 32. In this instance, clockwise rotation of the nut 16 causes the threads located on the inside of the threaded sleeve 14 to mesh with the threads on the threaded bolt 12 and operate to move the threaded bolt 12 and the lamp housing 10 into the lamp cavity 30, or in the direction of arrow 40. The manufacturer ceases clockwise rotation of the nut 16 when the lens portion (not shown) of the lamp housing 10 becomes flush with the top and bottom body panels 32.

Figure 4:
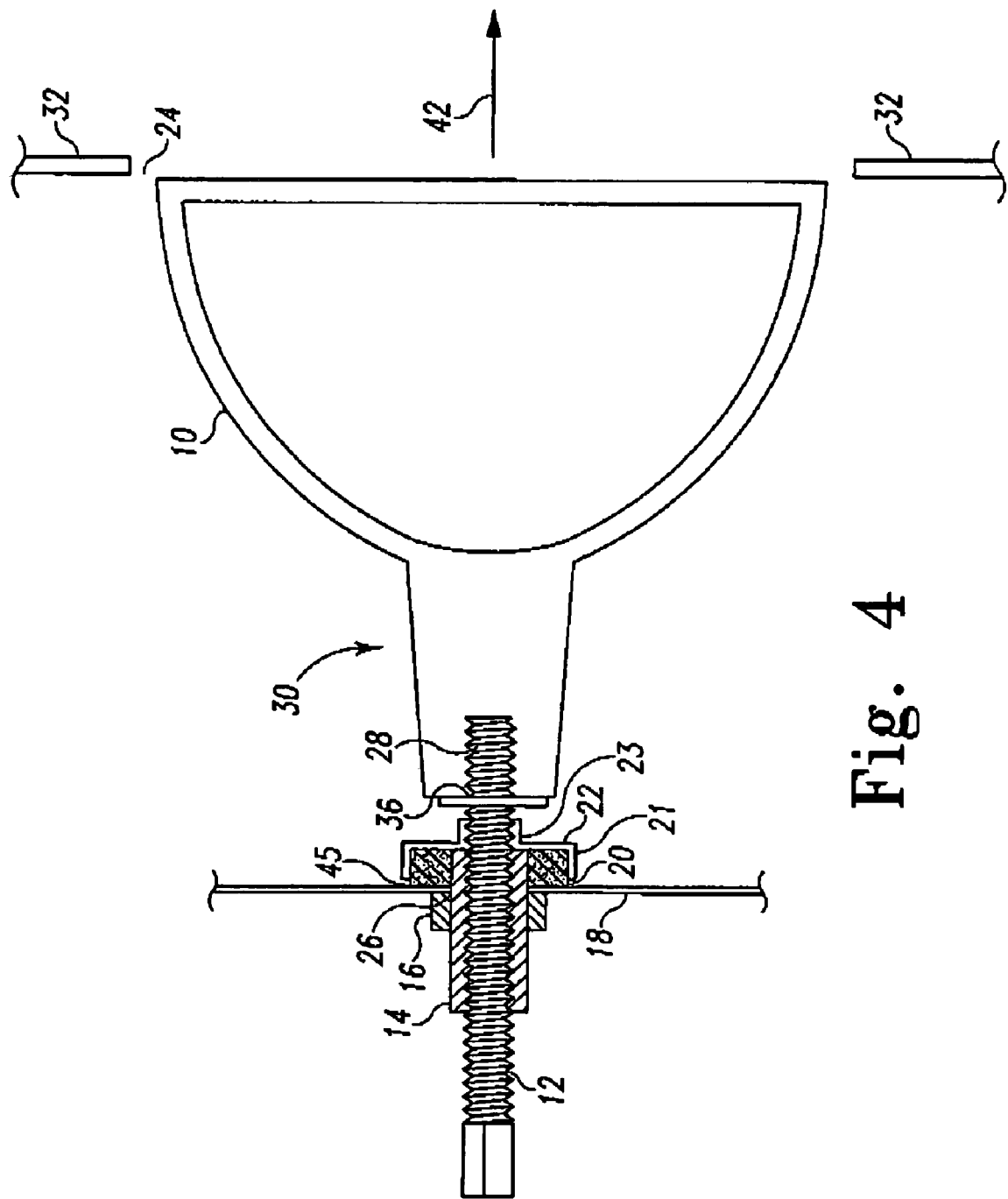
FIG. 4 is a side view of the adjustable rear lamp of FIG. 1, where the lamp housing is improperly recessed into the lamp cavity.

A cut away view of an adjustable rear lamp 8 installed in an automobile, where the lamp housing 10 is inappropriately recessed in the lamp cavity 30, is shown in FIG. 4. The lamp housing 10 in FIG. 4 is too far recessed into the lamp cavity 30, such that the lamp housing 10 is not flush with the body panels 32. In this instance, counterclockwise rotation of the nut 16 causes the threads located on the inside of the threaded sleeve 14 to engage the threads on the threaded bolt 12 and operate to move the threaded bolt 12 and the lamp housing 10 out of the lamp cavity 30, or in the direction of arrow 42. The manufacturer ceases counterclockwise rotation of the nut 16 when the lens portion (not shown) of the lamp housing 10 becomes flush with the top and bottom body panels 32.

In each of the above examples, the movement and final positioning of the threaded bolt 12 and attached lamp housing 10 is controlled precisely, to ensure that the lamp housing 10 fits properly inside the lamp cavity 30, with respect to the top and bottom body panels 32.

Although other advantages may be found and realized and various modifications may be suggested by those versed in the art, it is understood that the present invention is not to be limited to the details given above, but rather may be modified within the scope of the appended claims.

We claim:

1. An adjustable rear lamp secured to sheet metal of an automobile, the sheet metal having a front side and a rear side and including at least one hole therethrough, the adjustable rear lamp comprising:
   a. a housing;
   b. a bolt attached to the housing and extending rearwardly from the housing; and
   c. a threaded sleeve rotatably mounted in the hole in the sheet metal, the threaded sleeve threadedly engaging the bolt, wherein rotation of the threaded sleeve in the hole causes the threaded bolt to travel along the axis of the threaded sleeve;
   d. a retaining clip releaseably connected to the threaded sleeve, wherein rotation of the treaded sleeve in the hole causes the retaining clip to rotate with the threaded sleeve.

2. An adjustable rear lamp as in claim 1, further comprising a nut fixedly attached to the threaded sleeve.

3. An adjustable rear lamp as in claim 2 wherein the nut is arranged and disposed upon the threaded sleeve so that it is positioned upon the front side of the sheet metal when the adjustable rear lamp is secured to the sheet metal.

4. An adjustable rear lamp as in claim 1, further comprising a foam insert surrounding the threaded sleeve.

5. An adjustable rear lamp as in claim 4, wherein the retaining clip comprises a flange portion for snugly retaining the foam insert around the threaded sleeve.

6. An adjustable rear lamp as in claim 4 wherein the retaining clip is arranged upon the threaded sleeve so that it is positioned upon the rear side of the sheet metal when the adjustable rear lamp is secured to the sheet metal.

7. An adjustable rear lamp as in claim 1, wherein the threaded bolt is fixedly secured to the housing.

8. An adjustable lamp for an automobile, the adjustable lamp designed for retention upon sheet metal within the automobile, the adjustable lamp comprising:
   a. a housing;
   b. a bolt attached to the housing and extending rearwardly from the housing;
   c. a cylindrical sleeve threadedly engaging the bolt, wherein rotation of the threaded sleeve causes the threaded bolt to travel along the axis of the threaded sleeve; and
   d. a retaining clip adjacent to the threaded sleeve and threadedly engaging the bolt.

9. The adjustable lamp of claim 8 further comprising a nut fixedly attached to the threaded sleeve, wherein the nut is designed for placement on one side of the sheet metal and the retaining clip is designed for placement on the opposite side of the sheet metal.

10. The adjustable lamp of claim 8 further comprising a foam insert surrounding the cylindrical sleeve and adjacent to the retaining clip, wherein the retaining clip is designed to hold the foam insert against the sheet metal.

11. The adjustable lamp of claim 10 wherein the retaining clip includes a flange that surrounds the foam insert.

12. The adjustable lamp of claim 11 wherein the bolt is fixedly secured to the housing.

* * * * *